United States Patent
Vakili

(10) Patent No.: US 11,222,320 B1
(45) Date of Patent: Jan. 11, 2022

(54) SYSTEMS AND METHODS FOR CONTROLLING AN AUTOMATED TRANSACTION MACHINE

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 125 days.

(21) Appl. No.: 15/804,302

(22) Filed: Nov. 6, 2017

(51) Int. Cl.
| | |
|---|---|
| *G10L 13/00* | (2006.01) |
| *G06Q 20/10* | (2012.01) |
| *G10L 15/22* | (2006.01) |
| *G10L 15/18* | (2013.01) |
| *G06F 16/951* | (2019.01) |
| *H04L 29/08* | (2006.01) |

(52) U.S. Cl.
CPC ....... *G06Q 20/1085* (2013.01); *G06F 16/951* (2019.01); *G10L 13/00* (2013.01); *G10L 15/18* (2013.01); *G10L 15/22* (2013.01); *G10L 2015/223* (2013.01); *H04L 67/12* (2013.01)

(58) Field of Classification Search
CPC .. G06Q 20/1085; G06Q 40/00; G06F 16/951; G10L 13/00; G10L 15/18; G10L 15/22; G10L 2015/223; H04L 67/12
USPC .................................................. 705/35, 43
See application file for complete search history.

(56) References Cited

U.S. PATENT DOCUMENTS

| | | | | |
|---|---|---|---|---|
| 5,870,724 A | * | 2/1999 | Lawlor | G06Q 20/04 705/42 |
| 7,216,299 B2 | * | 5/2007 | Knight | G06F 3/04847 715/764 |
| 8,112,330 B1 | * | 2/2012 | Grandcolas | G06Q 20/32 705/35 |
| 8,639,580 B1 | * | 1/2014 | Van Horn | G06Q 10/087 705/26.2 |
| 8,990,076 B1 | | 3/2015 | Strom | |

(Continued)

FOREIGN PATENT DOCUMENTS

| | | |
|---|---|---|
| JP | 2008-039928 A | 2/2008 |
| WO | WO-2007/041223 A2 | 4/2007 |

OTHER PUBLICATIONS

Kramer, Andrew E. "A Russian A.T.M. With an Ear for the Truth." The New York Times, [retrieved Dec. 1, 2017]; retrieved from the Internet: <URL: http://www.nytimes.com/2011/06/09/business/global/09atm.html>; (dated Jun. 8, 2011), 4 pages.

(Continued)

*Primary Examiner* — Christopher Bridges
*Assistant Examiner* — Timothy T. Hsieh
(74) *Attorney, Agent, or Firm* — Alston & Bird LLP

(57) ABSTRACT

Systems, apparatuses, methods, and computer program products are disclosed for controlling a function of an automated transaction machine (ATM). An example method includes receiving, by query language processing (QLP) circuitry, a query command signal. The example method further includes generating, by the QLP circuitry based on the query command signal, a control signal configured to instruct the ATM to perform the function by crawling a tree-structured menu of the ATM. Subsequently, the example method includes transmitting, by the QLP circuitry to the ATM, the control signal.

20 Claims, 6 Drawing Sheets

(56) References Cited

U.S. PATENT DOCUMENTS

| | | | |
|---|---|---|---|
| 9,443,527 B1* | 9/2016 | Watanabe | G10L 15/26 |
| 2002/0040297 A1* | 4/2002 | Tsiao | G10L 15/26 |
| | | | 704/257 |
| 2012/0109792 A1* | 5/2012 | Eftekhari | G06Q 40/02 |
| | | | 705/31 |
| 2012/0223134 A1* | 9/2012 | Smith | G06Q 20/3223 |
| | | | 235/379 |
| 2013/0325448 A1 | 12/2013 | Levien et al. | |
| 2016/0027005 A1* | 1/2016 | Kurian | G07F 19/20 |
| | | | 235/379 |
| 2016/0189123 A1* | 6/2016 | Lucia Specogna | G06Q 20/405 |
| | | | 705/43 |
| 2017/0257433 A1* | 9/2017 | Rosa | H04L 12/4625 |
| 2019/0073663 A1* | 3/2019 | Jamkhedkar | G06Q 20/3223 |
| 2019/0095888 A1* | 3/2019 | Monaghan | G07F 19/209 |

OTHER PUBLICATIONS

Salagar, R.D et al. "Voice Enabled ATM Machine with Iris Recognition for Authentication." Proceedings of 3rd IRF International. Conference; Goa, India, May 10, 2015; pp. 70-75.

\* cited by examiner

US 11,222,320 B1

SYSTEMS AND METHODS FOR CONTROLLING AN AUTOMATED TRANSACTION MACHINE

TECHNOLOGICAL FIELD

Example embodiments of the present disclosure relate generally to automated transaction machines (ATMs) and, more particularly, to systems and methods for controlling ATMs.

BACKGROUND

The inventors have discovered problems with existing mechanisms for controlling functions of a legacy ATM without using a keypad. Through applied effort, ingenuity, and innovation, the inventors has solved many of these identified problems by developing solutions embodied by the present disclosure and described in detail below.

BRIEF SUMMARY

Systems, apparatuses, methods, and computer program products are disclosed herein for controlling a function of an automated transaction machine (ATM) using a menu crawling system that comprises a query language processing (QLP) circuitry. The menu crawling system provided herein solves the above problems by controlling functions of an ATM without the use of a keypad.

In one example embodiment, a system is provided for controlling a function of an ATM. The system may comprise QLP circuitry in communication with the ATM. The QLP circuitry may be configured to receive a query command signal. The QLP circuitry may be further configured to generate a control signal based on the query command signal. The control signal may be configured to instruct the ATM to perform the function by crawling a tree-structured menu of the ATM. The QLP circuitry may be further configured to transmit the control signal to the ATM.

In another example embodiment, an apparatus is provided for controlling a function of an ATM. The apparatus may comprise communications circuitry configured to transmit, over a communications network to speech-to-text (STT) circuitry, electronic information indicative of a command provided by a user. The communications circuitry may be further configured to receive, over the communications network from QLP circuitry, a control signal configured to instruct the ATM to perform the function by crawling a tree-structured menu of the ATM. The communications circuitry may be further configured to transmit the control signal over the communications network to the ATM. The apparatus may further comprise processing circuitry in communication with the communications circuitry. The processing circuitry may be configured to transmit the electronic information indicative of the command provided by the user to the communications circuitry for transmission to the STT circuitry. In response, the processing circuitry may be further configured to receive the control signal from the communications circuitry. The processing circuitry may be further configured to transmit the control signal to the communications circuitry for transmission to the ATM.

In yet another example embodiment, a method is provided for controlling a function of an ATM. The method may comprise receiving, by QLP circuitry, a query command signal. The method may further comprise generating, by the QLP circuitry based on the query command signal, a control signal configured to instruct the ATM to perform the function by crawling a tree-structured menu of the ATM. The method may further comprise transmitting, by the QLP circuitry to the ATM, the control signal.

In yet another example embodiment, a computer program product is provided for controlling a function of an ATM. The computer program product may comprise at least one non-transitory computer-readable storage medium having computer-executable program code stored therein. The computer-executable program code may comprise program code instructions configured to transmit, to communications circuitry, the electronic information indicative of the command provided by the user. The program code instructions may be further configured to receive, from the communications circuitry in response to the electronic information indicative of the command provided by the user, the control signal configured to instruct the ATM to perform the function by crawling the tree-structured menu of the ATM. The program code instructions may be further configured to transmit the control signal to the communications circuitry for transmission to the ATM.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
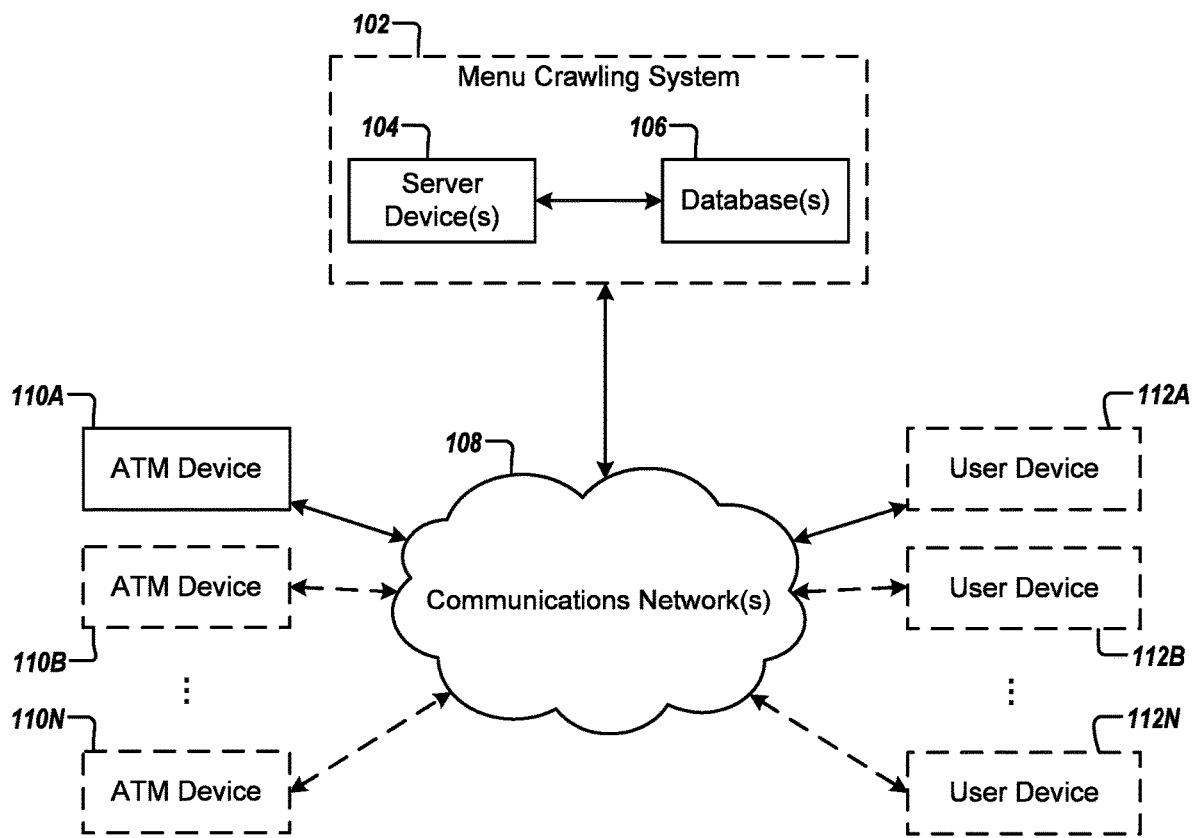
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for controlling functions of ATMs. Traditionally, users interact with an ATM by crawling through a tree-structured menu illustrated on a display of the ATM. In some embodiments described herein, a menu crawling system may be used to retrofit a legacy ATM that is not voice operable to newly provide voice operability. To do this, the menu crawling system of such embodiments translates speech or text commands (or both) into the traditional crawling steps used to crawl the tree-structured menus of a legacy ATM that, in turn, cause performance of a desired operation, function, or command. Some example embodiments make modifications to legacy ATM software to interact with a user through voice commands and support natural speech. In other embodiments, a new ATM machine may be built with these capabilities without the crawling function.

In some embodiments, the present disclosure relates to a software suite that can be deployed using hardware to retrofit a legacy ATM with voice operability. The software suite may comprise a speech-to-text (STT) module, a natural language processing (NLP) module, and a query language processing (QLP) module. The STT module may obtain a voice command from a user desiring to command the ATM to perform a function, such as withdrawing or depositing currency. The STT module then may translate the voice command into text. The NLP module may obtain the text from STT module, decipher the nature of the command, and translate the command into query command. The QLP module may obtain the query command and translate the query command into crawling steps to crawl the tree-structured menu of a legacy transaction machine. In some instances, these crawling steps may be comprised in, or referred to as, a "control signal" that is configured to instruct the ATM to perform the function by crawling the tree-structured menu of the ATM. In some embodiments, the system may also have a text-to-speech (TTS) module to vocalize responses to the user's voice input. In some instances, the functionality of the TTS module may be comprised by the STT module as a feature thereof.

In some embodiments, one or more of these modules may be hosted locally by the ATM. For example, the STT module, the NLP module, the QLP module, any other module, or any combination thereof may be hosted locally by an ATM that has been retrofitted with additional computerized components. In some embodiments, one or more of these modules may be hosted remotely (e.g., by one or more separate devices or one or more cloud servers) and thus need not reside on the ATM. Thus, some or all of the functionality described herein may be provided by a third party. For example, when remotely provisioning an ATM, the ATM may access one or more of third party modules via a digitizer and a telephone module, a Wi-Fi module, a software phone module, or any sort of networked connection that facilitates transmission of digitized voice commands to the STT module. In turn, the STT module may be connected to the other modules, such as the NLP module and the QLP module.

In one example, a user may walk or drive up to a transaction machine (e.g., an ATM) and utter a voice command (e.g., "need a hundred dollars from my checking account"). The transaction machine may record this voice command and transfer it to a server having an STT utility. In some embodiments, the transaction machine may have a digitizer and a telephone module, Wi-Fi module, or software phone module. In some embodiments, the transaction machine may have a connected networking capability to send digitized voice command to the STT utility. The STT utility, which may be a third party cloud utility, may translate the voice command or the digital signal to text. The NLP utility, which may be a different third party cloud utility, may decipher the text and translate it into query command. The QLP utility, which may be yet another third party cloud utility, may translate the query command into steps taken to crawl the tree-structured menu of the transaction machine. This last step may not be necessary for some transaction machines. In some instances, a TTS utility may be used to communicate with the user. For example, the TTS utility may be used to tell the user that the transaction is complete or to request additional information or clarification from the user. In some embodiments, the TTS utility may be yet another third party cloud utility. In some embodiments, the TTS utility may be deployed alongside the STT unit at the same utility server or server farm in the same cloud platform.

There are many advantages of these and other embodiments described herein, such as: reducing interaction time; making transactions easier for users, especially if they have any handicap; reducing line-ups; promoting appeal; and, in some instances, benefiting from third party platforms which provide such services as STT, NLP or QLP utilities.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, terms such as "front," "rear," "top," "bottom," "inside," "outside," "near," "far," "on," "in," and other similar terms are used for explanatory purposes in the examples provided below to describe the relative position of certain devices or portions of devices. Terminology used in this disclosure is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "software module," "utility," "cloud utility," "suite," and "software suite" (or other such terms) should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, utilities, or suites.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more ATMs and one or more user devices. Example embodiments of the ATM and user devices include any of a variety of mobile terminals, such as a portable digital assistant (PDA), mobile telephone, smartphone, laptop computer, tablet computer, or any combination of the aforementioned devices.

FIG. 1 illustrates a system diagram of a set of devices that may be involved in some example embodiments described herein. In this regard, FIG. 1 discloses an example computing system 100 within which embodiments of the present disclosure may operate. As illustrated, a menu crawling system 102 may be connected to one or more ATM devices 110A-110N and one or more server devices 104 in communication with one or more databases 106. In some embodiments, menu crawling system 102 may be configured to control a function of one or more ATM devices 110A-110N as described in further detail below.

The menu crawling system 102 may be embodied as a computer or computers as known in the art. The menu crawling system 102 may provide for receiving a query command signal from various sources, including but not necessarily limited to the ATM devices 110A-110N, the user devices 112A-112N, or both. For example, the menu crawling system 102 may be operable to receive and process query command signals, control signals, and electronic information provided by the menu crawling system 102 and/or other devices. The menu crawling system 102 may evaluate a query command signal, and may also generate one or more control signals based on the query command signal.

The one or more server devices 104 may be embodied as one or more servers, remote servers, cloud-based servers (e.g., cloud utilities), processors, or any other suitable server devices, or any combination thereof. The one or more server devices 104 receive, process, generate, and transmit data, signals, and electronic information to facilitate the operations of the menu crawling system 102.

The one or more databases 106 may be embodied as one or more data storage devices such as a Network Attached Storage (NAS) device or devices, or as a separate database server or servers. The one or more databases 106 include information accessed and stored by the menu crawling system 102 to facilitate the operations of the menu crawling system 102. For example, the one or more databases 106 may store user account credentials for users of ATM devices 110A-110N or user devices 112A-112N, and/or data regarding device characteristics of various ATM devices 110A-110N or user devices 112A-112N.

The one or more ATM devices 110A-110N may be embodied by any ATM known in the art. In some embodiments, the ATM devices 110A-110N may comprise or be coupled to one or more vaults, such as currency vaults and deposit vaults. Information received by the menu crawling system 102 from these devices may be provided in various forms and via various methods. It will be understood, however, that in some embodiments, the ATM devices 110A-110N need not themselves be ATMs, but may be peripheral devices communicatively coupled to ATMs, such as laptop computers, smartphones, netbooks, tablet computers, wearable devices, or the like. While embodiments described herein may utilize the microphones, speakers, and/or cameras contained in ATM devices 110A-110N, embodiments described herein also enable voice communication with ATM devices 110A-110N that lack such components. In some embodiments, ATM devices 110A-110N may comprise one or more internal cabinets that provide cash and check storage. In some embodiments, ATM devices 110A-110N may dispense cash (e.g., bills), receive cash, authenticate and sort received bills, scan and receive checks, receive debit or credit card dips and scan information from a magnetic stripe (magstripe) or chip; receive debit or credit information via near field communications (NFC). For example, ATM devices 110A-110N may dispense a requested amount of cash (e.g., bills) in response to a user navigating the menu through the QLP input.

In some embodiments, ATM devices 110A-110N may dispense currency (e.g., cash, bills), such as in response to a control signal received from the menu crawling system 102. For example, the menu crawling system 102 may receive electronic information indicative of a command provided by a user to withdraw currency (e.g., twenty dollars) from an account (e.g., the user's checking account), generate a control signal configured to instruct the ATM device 110A to withdraw the currency from the account by crawling the tree-structured menu of the ATM device 110A, and transmit the control signal to the ATM device 110A. The ATM device 110A may receive the control signal and dispense cash (e.g., a twenty dollar bill) from a cash storage cabinet internal to the ATM device 110A.

In some embodiments, ATM devices 110A-110N may receive currency (e.g., cash, bills, personal checks, cashier's checks, official checks, money orders, banknotes, promissory notes, negotiable instruments, and any combination thereof), such as in response to a control signal received from the menu crawling system 102. For example, the menu crawling system 102 may receive electronic information indicative of a command provided by a user to deposit currency (e.g., two hundred dollars) to an account (e.g., the user's savings account), generate a control signal configured to instruct the ATM device 110A to deposit the currency to the account by crawling the tree-structured menu of the ATM device 110A, and transmit the control signal to the ATM device 110A. The ATM device 110A may receive the control signal and receive currency (e.g., a one hundred dollar bill and a personal check payable to the user in the amount of one hundred dollars), authenticate and sort the received currency, scan and receive the received check, and store the received currency in a cash and check storage cabinet internal to the ATM device 110A.

The one or more user devices 112A-112N may be embodied by any computing device known in the art. Information received by the menu crawling system 102 from these devices may be provided in various forms and via various methods. For example, the user devices 112A-112N may be laptop computers, smartphones, netbooks, tablet computers, wearable devices, or the like, and the information may be provided through various modes of data transmission provided by these consumer devices.

In embodiments where a user device 112 is a mobile device, such as a smartphone or tablet, the mobile device may execute an "app" (e.g., a thin-client application) to interact with the menu crawling system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., ATMs). Communication with hardware and software modules executing outside of the app is typically provided via application programming interfaces (APIs) provided by the mobile device operating system.

Additionally or alternatively, the ATM devices 110A-110N and/or the user devices 112A-112N may interact with the menu crawling system 102 over one or more communications networks 108. As yet another example, the ATM devices 110A-110N and/or the user devices 112A-112N may include various hardware or firmware designed to interface with the menu crawling system 102. For example, an example ATM device 110A may be an ATM modified to communicate with the menu crawling system 102, and another example ATM device 110B may be a purpose-built device, such as a retrofitting device offered for the primary purpose of facilitating communication between an ATM and the menu crawling system 102. In another example, the user device 112 may be a purpose-built device such as a dongle offered for the primary purpose of communicating with the menu crawling system 102.

As a foundation for some embodiments, the application may prompt the ATM devices 110A-110N, the user devices 112A-112N, or both to provide a command, and may transmit electronic information indicative of the command to menu crawling system 102. For example, the menu crawling system 102 may receive, from ATM device 110 or user device 112, electronic information indicative of a command provided by a user. The user may provide the command in a desire to instruct ATM device 110 to perform a function, such as to withdraw currency from, or deposit currency to, an account associated with the user. The menu crawling system 102 may further generate a query command signal based on the electronic information indicative of the command provided by the user. The menu crawling system 102 may further generate a control signal based on the query command signal and transmit the control signal to ATM device 110. The control signal may be configured to instruct the ATM device 110 to perform the function (e.g., to withdraw currency from, or deposit currency to, the account associated with the user) by crawling a tree-structured menu of the ATM.

In some embodiments, the electronic information indicative of the command provided by the user may be electronic information indicative of a voice command spoken by a user (e.g., a digitized voice command). In these instances, the menu crawling system 102 may generate, based the electronic information indicative of the voice command spoken by the user, electronic information indicative of a textual representation of the voice command. The menu crawling system 102 may further generate a query command signal based on the electronic information indicative of the textual representation of the voice command spoken by the user. The menu crawling system 102 may further generate a control signal based on the query command signal and transmit the control signal to ATM device 110. The control signal may be configured to instruct the ATM device 110 to perform the function (e.g., to withdraw currency from, or deposit currency to, the account associated with the user) by crawling a tree-structured menu of the ATM. For example, the menu crawling system 102 may comprise a map of the tree-structured menu of the ATM. The menu crawling system 102 may receive the query command signal and generate the control signal based on the map of the tree-structured menu of the ATM. In some embodiments, the user device 112 may comprise a map of the tree-structured menu of the ATM. In some embodiments, ATM device 110, user device 112, or both may comprise firmware or software configured to update the map of the tree-structured menu of the ATM. In some embodiments, the map of the tree-structured menu of the ATM stored on ATM devices 110A-110N and the thin-client applications of user devices 112A-112N may be the same.

In some embodiments, the menu crawling system 102 may receive and process a query command signal to generate a control signal configured to instruct the ATM device 110 to perform the function by crawling a tree-structured menu of the ATM device 110. For example, the menu crawling system 102 may communicate directly with the ATM input signal processing interface of an ATM device 110. When a user presses an option on the screen (e.g., a virtual or soft button) or side-panel (e.g., a physical button) of the ATM device 110, the ATM input signal processing interface of the ATM device 110, or processing circuitry in communication therewith, may transform that signal into an electronic signal and the menu selection of the ATM device 110 may advance to the next level in the tree-structured menu of the ATM device 110. In some embodiments, the pairing of the crawling system 102 with the ATM input signal processing interface of the ATM device 110 may provide the same signal or a substantially similar signal to the signal provided if a user had selected that particular option through on-screen menu selection on the ATM device 110. In one example, the menu crawling system 102 may provide control signals corresponding to "withdrawal," "checking," "100," "yes," and "no" in sequence to the ATM input signal processing interface of ATM device 110. These control signals may be configured to instruct the ATM device 110 to crawl the tree-structured menu (e.g., crawl up the menu selection) of the ATM device 110 until the transaction (e.g., a one hundred dollar withdrawal from checking with a receipt and with no further request) is complete. After each of these prompts to the ATM input signal processing interface of the ATM device 110, the menu crawling system 102 may pause to receive the next prompt from the ATM device 110.

The menu crawling system 102 may further receive, from ATM device 110, user device 112, or any other device or server, a response signal (e.g., an acknowledgement or ACK signal) generated in response to the control signal. Upon receipt of the response signal, the menu crawling system 102 may generate electronic information indicative of a vocal representation of the response signal. The menu crawling system 102 may further transmit, to ATM device 110, user device 112, or any other device or server with which the user is interacting, the electronic information indicative of the vocal representation of the response signal. For example, the response signal may indicate that a command to withdraw or deposit currency was successful. In another example, the response signal may indicate that a command to withdraw currency was not successful due to insufficient funds. In another example, the response signal may comprise an indication of a balance of the account. For example, the electronic information indicative of the vocal representation of the response signal may be an electronic signal configured to be output, through a speaker, a voice response such as "withdrawal successful," "insufficient funds," "deposit successful," "your new account balance is X,XXX.XX," or any other suitable response. In some embodiments, the menu crawling system 102 may generate the response signal based on the control signal using a map or look-up table. For example, the menu crawling system 102 may store (e.g., in memory or in one or more databases 106) or have access to (e.g., through one or more communications networks 108) a tree structured menu of the ATM device 110 which is a replica of (e.g., the same as or substantially similar to) the tree structured menu of the ATM device 110. In another example, the menu crawling system 102 may store (e.g., in memory or in one or more databases 106) or have access to (e.g., through one or more communications networks 108) a plurality of tree structured menus of the ATM devices 110A-110N which are replicas of (e.g., the same as or substantially similar to) the tree structured menus of the ATM devices 110A-110N.

In some embodiments, the ATM device 110 may be an alternative delivery channel (ADC) based on a computing device, such as a computer with an operating system and specific peripherals. For example, the ATM device 110 may comprise a computing device configured to store and execute programming code in the following programming languages: C; C++; pro*C; any other suitable programming language; and any combination thereof. The menu crawling system 102 may use the input signals that are received from the ATM input signal processing interface of an ATM device 110 via the underlying program. For instance, menu crawling system 102 may transmit a "yes" string to the ATM device 110 that may correspond to a user pressing "yes" on the screen of ATM device 110 or user device 112, speaking the word "yes," or making a gesture indicative of a "yes" or affirmation.

Example Implementing Apparatus

Figure 2:
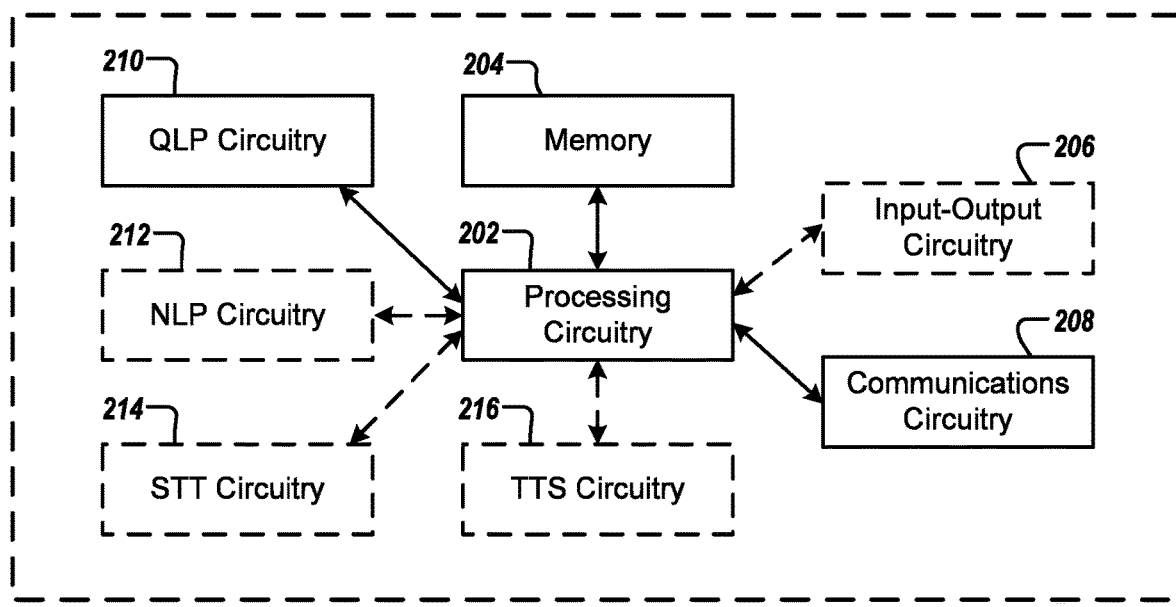
FIG. 2 illustrates a schematic block diagram of example circuitry that may perform various operations in accordance with some example embodiments described herein.

The menu crawling system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, query language processing (QLP) circuitry 210, natural language processing (NLP) circuitry 212, speech-to-text (STT) circuitry 214, and text-to-speech (TTS) circuitry 216. The apparatus 200 may be configured to execute the operations described above with respect to FIG. 1 and below with respect to FIGS. 3-6. Although some of these components 202-216 are described with respect to their functional capabilities, it should be understood that the particular implementations necessarily include the use of particular hardware to implement such functional capabilities. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store query command signals, control signals, electronic information, response signals, and maps of the tree-structured menus of one or more ATMs and/or updates thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204).

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, Near Field Communications (NFC), Worldwide Interoperability for Microwave Access (WiMAX) or other proximity-based communications protocols.

The QLP circuitry 210 includes hardware components designed or configured to receive a query command signal, generate a control signal based on the query command signal, and transmit the control signal to the ATM. These hardware components may, for instance, utilize communications circuitry 208 to communicate with an ATM (e.g., one or more of ATM devices 110A-110N), a user device (e.g., one or more of user devices 112A-112N), NLP circuitry 212, STT circuitry 214, TTS circuitry 216, or any other suitable circuitry or device. For example, the QLP circuitry 210 may be in communication with an ATM, and thus configured to transmit the control signal to the ATM, via communications circuitry 208. The control signal may be configured to instruct the ATM to perform the function by crawling a tree-structured menu of the ATM. For example, the control signal may be configured to instruct the ATM device 110 to perform the function (e.g., to withdraw currency from, or deposit currency to, the account associated with the user) by crawling a tree-structured menu of the ATM device 110. In some embodiments, the QLP circuitry 210 may receive the query command signal, access a map of the tree-structured menu of the ATM device 110 (e.g., a map or look-up table stored in memory 204), and generate the control signal based on the query command signal and the map of the tree-structured menu of the ATM device 110. The QLP circuitry 210 may be further designed or configured to receive the query command signal from the NLP circuitry 212. For example, the QLP circuitry 210 may be in communication with the NLP circuitry 212, and thus configured to receive the query command signal from the NLP circuitry 212, via communications circuitry 208. The QLP circuitry 210 may utilize processing circuitry 202 to perform the above operations, and may utilize memory 204 to store collected query command signals or other electronic information. It should also be appreciated that, in some embodiments, the QLP circuitry 210 may include a separate processor, specially configured field programmable gate array (FPGA), application specific interface circuit (ASIC), or cloud utility to perform the above functions. In some embodiments, the QLP circuitry 210 may be further configured to generate electronic information indicative of a proximity of the ATM to a user device; and transmit the control signal to the ATM based on proximity information. The proximity information may include, for example, information indicative of the geographic proximity of the user device to the ATM device (e.g., the distance between a user device and an ATM device based on PAN or NFC proximity determination methods; the ATM to which an ATM card associated with the user device has been inserted and verified; or any other suitable information).

In some embodiments, the QLP circuitry 210 may receive and process a query command signal to generate a control signal configured to instruct an ATM (e.g., ATM device 110) to perform the function by crawling a tree-structured menu of the ATM. For example, QLP circuitry 210 may be in communication (e.g., through communications circuitry 208) with the ATM input signal processing interface of an ATM. When a user presses an option on the screen (e.g., a virtual or soft button) or side-panel (e.g., a physical button) of the ATM, the ATM input signal processing interface of the ATM, or processing circuitry in communication therewith, may transform that signal into an electronic signal and the menu selection of the ATM may advance to the next level in the tree-structured menu of the ATM. In some embodiments, the pairing of the QLP circuitry 210 with the ATM input signal processing interface of the ATM may provide the same signal or a substantially similar signal to the signal provided when a user selects that particular option through on-screen menu selection on the ATM. In one example, the QLP circuitry 210 may provide control signals corresponding to "withdrawal," "checking," "100," "yes," and "no" in sequence to the ATM input signal processing interface of ATM. These control signals may be configured to instruct the ATM to crawl the tree-structured menu (e.g., crawl up the menu selection) of the ATM until the transaction (e.g., a one hundred dollar withdrawal from checking with a receipt and with no further request) is complete. After each of these prompts to the ATM input signal processing interface of the ATM, the QLP circuitry 210 may pause to receive the next prompt from the ATM.

The NLP circuitry 212 includes hardware components designed or configured to receive electronic information indicative of a command provided by a user, generate the query command signal based on the electronic information indicative of the command provided by the user, and transmit the query command signal to the QLP circuitry 210. These hardware components may, for instance, utilize communications circuitry 208 to communicate with an ATM (e.g., one or more of ATM devices 110A-110N), a user device (e.g., one or more of user devices 112A-112N), QLP circuitry 210, STT circuitry 214, TTS circuitry 216, or any other suitable circuitry or device. For example, the NLP circuitry 212 may be in communication with the QLP circuitry 210, and thus configured to transmit the query command signal to the QLP circuitry 210, via communications circuitry 208. The NLP circuitry 212 may be further designed or configured to receive electronic information indicative of a textual representation of a voice command provided by a user and generate the query command signal based on the electronic information indicative of the textual representation of the voice command. For example, the NLP circuitry 212 may be in communication with the STT circuitry 214, and thus configured to receive the electronic information indicative of the textual representation of the voice command from the STT circuitry 214, via communications circuitry 208. The NLP circuitry 212 may utilize processing circuitry 202 to perform the above operations, and may utilize memory 204 to store collected electronic information indicative of commands provided by users, query command signals, or other electronic information. It should also be appreciated that, in some embodiments, the NLP circuitry 212 may include a separate processor, specially configured field programmable gate array (FPGA), application specific interface circuit (ASIC), or cloud utility to perform the above functions.

The STT circuitry 214 includes hardware components designed or configured to receive first electronic information indicative of a voice command provided by a user, generate second electronic information indicative of a textual representation of the voice command based on the first electronic information indicative of the voice command, and transmit, the second electronic information indicative of the textual representation of the voice command to the NLP circuitry 212. These hardware components may, for instance, utilize communications circuitry 208 to communicate with an ATM (e.g., one or more of ATM devices 110A-110N), a user device (e.g., one or more of user devices 112A-112N), QLP circuitry 210, NLP circuitry 212, TTS circuitry 216, or any other suitable circuitry or device. For example, the STT circuitry 214 may be in communication with an ATM, and thus configured to receive, via communications circuitry 208, the first electronic information indicative of the voice command provided by the user to the ATM. In another example, the STT circuitry 214 may be in communication with the NLP circuitry 212, and thus configured to transmit the second electronic information indicative of the textual representation of the voice command to the NLP circuitry 212, via communications circuitry 208. The STT circuitry 214 may utilize processing circuitry 202 to perform the above operations, and may utilize memory 204 to store collected electronic information indicative of voice commands provided by users, electronic information indicative of textual representations of the voice commands, or other electronic information. It should also be appreciated that, in some embodiments, the STT circuitry 214 may include a separate processor, specially configured field programmable gate array (FPGA), application specific interface circuit (ASIC), or cloud utility to perform the above functions.

The TTS circuitry 216 includes hardware components designed or configured to receive a response signal in response to transmission of the control signal, generate electronic information indicative of a vocal representation of the response signal based on the response signal, and transmit the electronic information indicative of the vocal representation of the response signal to the input-output circuitry 206. These hardware components may, for instance, utilize communications circuitry 208 to communicate with an ATM (e.g., one or more of ATM devices 110A-110N), a user device (e.g., one or more of user devices 112A-112N), QLP circuitry 210, NLP circuitry 212, STT circuitry 214, or any other suitable circuitry or device. For example, the TTS circuitry 216 may be in communication with an ATM, and thus configured to transmit the electronic information indicative of the vocal representation of the response signal to the ATM, via communications circuitry 208. The TTS circuitry 216 may utilize processing circuitry 202 to perform the above operations, and may utilize memory 204 to store collected response signals, electronic information indicative of the vocal representations of the response signals, or other electronic information. It should also be appreciated that, in some embodiments, the TTS circuitry 216 may include a separate processor, specially configured field programmable gate array (FPGA), application specific interface circuit (ASIC), or cloud utility to perform the above functions. In some embodiments, the STT circuitry 214 may partially or wholly comprise the TTS circuitry 216.

In some embodiments, apparatus 200 or portions thereof may be deployed to retrofit a legacy ATM with voice operability. For example, the STT circuitry 214 may obtain a voice command from a user desiring to command the ATM (e.g., ATM device 110 described with reference to FIG. 1) to perform a function, such as withdrawing or depositing currency. The voice command may be uttered by the user to a microphone coupled to the ATM device 110 or to a user device 112 associated with the ATM device 110. The STT circuitry 214 then may translate the voice command into text. The NLP circuitry 212 may obtain the text from STT circuitry 214, decipher the nature of the command, and translate the command into query command. The QLP circuitry 210 may obtain the query command and translate the query command into crawling steps to crawl the tree-structured menu of the ATM. In some instances, these crawling steps may be comprised in, or referred to as, a "control signal" that is configured to instruct the ATM to perform the function by crawling the tree-structured menu of the ATM. In some embodiments, TTS circuitry 216 may vocalize a response (e.g., a response signal as described herein) to the user's voice input. In some instances, the functionality of the TTS circuitry 216 may be comprised by the STT circuitry 214 as a feature thereof.

In some embodiments, one or more of QLP circuitry 210, NLP circuitry 212, STT circuitry 214, and TTS circuitry 216 may be hosted locally by the apparatus 200. For example, the QLP circuitry 210, NLP circuitry 212, STT circuitry 214, and TTS circuitry 216, any other circuitry, or any combination thereof may be hosted locally by an apparatus 200 comprising or in communication with an ATM that has been retrofitted with additional computerized components. In some embodiments, one or more of QLP circuitry 210, NLP circuitry 212, STT circuitry 214, and TTS circuitry 216 may be hosted remotely (e.g., by one or more cloud servers) and thus need not physically reside on the apparatus 200. Thus, some or all of the functionality described herein may be provided by a third party. For example, when remotely provisioning an apparatus 200, the apparatus 200 may access one or more of third party circuitries via a digitizer and a telephone module, a Wi-Fi module, a software phone module, or any sort of networked connection that facilitates transmission of digitized voice commands to the STT circuitry 214. In turn, the STT circuitry 214 may be in remote communication with one or more of QLP circuitry 210, NLP circuitry 212, and TTS circuitry 216. In some embodiments, one or more of the QLP circuitry 210, the NLP circuitry 212, and the STT circuitry 214 may be hosted remotely from the ATM. For example, the STT circuitry 214 may be deployed as a first cloud utility, the NLP circuitry 212 may be deployed as a second cloud utility, and the QLP circuitry 210 may be deployed as a third cloud utility.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The ATM devices 110A-110N and user devices 112A-112N may be embodied by one or more computing devices or systems that also may include processing circuitry, memory, input-output circuitry, and communications circuitry. For example, an ATM device 110 may comprise an ATM having these circuitry elements, including, but not limited to, an ATM input signal processing interface configured to communicate with apparatus 200, menu crawling system 102 or user device 112 described with reference to FIG. 1, or any other device, apparatus, or system. In some instances, an ATM device 100 may comprise a peripheral device, such as a dongle, that has these circuitry elements and that is able to communicate with an ATM. As another example, a user device 112 may be a smartphone on which an app (e.g., a mobile banking app) is running or otherwise being executed by processing circuitry. As it relates to operations described in the present disclosure, the functioning of these components may be similar to the similarly named components described above with respect to FIG. 2. Additional description of the mechanics of these components is omitted for the sake of brevity. These device elements, operating together, provide the respective apparatuses with the functionality necessary to facilitate the communication of data (e.g., electronic marketing information, business analytic data, or the like) with the menu crawling system.

In some embodiments, the menu crawling system 102 may itself be a component of an ATM device 110 or a user device 112, in which case the various circuitries described above may in turn be components of the corresponding ATM device 110 or user device 112.

In some embodiments, a user may provide a command to an ATM device (e.g., one of ATM devices 110A-110N) or a user device (e.g., one of user devices 112A-112N). In some embodiments, the command provided by the user may be a voice command, a text command, a gesture, a click-based command, or any other command desired by the user to control a function of the ATM device. In one example, the command provided by the user may be indicative of a command to withdraw currency from an account, and the control signal may be configured to instruct the ATM to withdraw the currency from the account by crawling the tree-structured menu of the ATM (e.g., "type of transaction: spot transaction"; "Personal Identification Number (PIN) is XXXX"; "Verified or Not Verified: Verified"; "Withdrawal or Deposit: Withdrawal"; "Amount of Withdrawal: XX.XX U.S. dollars"; "Checking or Savings: Checking"; "Receipt or No Receipt: Receipt"; "Print Receipt or Email Receipt: Print Receipt"). In another example, the command provided by the user may be indicative of a command to deposit currency to an account, and the control signal may be configured to instruct the ATM to deposit the currency to the account by crawling the tree-structured menu of the ATM (e.g., "type of transaction: spot transaction"; "Personal Identification Number (PIN) is XXXX"; "Verified or Not Verified: Verified"; "Withdrawal or Deposit: Deposit"; "Amount of Deposit: XX.XX U.S. dollars"; "Checking or Savings: Savings"; "Receipt or No Receipt: Receipt"; "Print Receipt or Email Receipt: Email Receipt").

In some embodiments, the ATM device, the user device, or both may comprise input-output circuitry, communications circuitry, and processing circuitry. In some embodiments, the command provided by the user may be a voice command. In such embodiments, the ATM device, the user device, or both may be in communication with the STT circuitry 214 and configured to receive the voice command by the input-output circuitry, generate the first electronic information indicative of the voice command by the processing circuitry based on the voice command, and transmit the first electronic information indicative of the voice command by the communications circuitry to the STT circuitry 214. The input-output circuitry of the ATM device, the user device, or both may further comprise digitization circuitry configured to receive the voice command and generate a digitized voice command based on the voice command. In some instances, the first electronic information indicative of the voice command may comprise the digitized voice command. The input-output circuitry of the ATM device, the user device, or both may further comprise telephony circuitry in communication with the digitization circuitry. The telephony circuitry may be configured to receive the voice command, generate an analog voice command based on the voice command, and transmit the analog voice command to the digitization circuitry. The digitization circuitry may be further configured to receive the analog voice command from the telephony circuitry and generate the digitized voice command based on the analog voice command. In some embodiments, the input-output circuitry may comprise softphone circuitry (e.g., a session initiation protocol (SIP) phone, a voice over Internet Protocol (VoIP) phone). In some embodiments, the input-output circuitry may comprise audio output circuitry configured to receive the fourth electronic information indicative of the voice response from the TTS circuitry 216 and provide an audio output indicative of the voice response.

In some embodiments, apparatus 200 may relate to an apparatus configured to receive a command provided by a user by communications circuitry 208 or input-output circuitry 206, transmit that command to a menu crawling system (e.g., menu crawling system 102 described with reference to FIG. 1) by communications circuitry 208, and, in response, receive a control signal from the menu crawling system by communications circuitry 208. For example, apparatus 200 may comprise communications circuitry 208 configured to transmit, over a communications network to STT circuitry, electronic information indicative of a command provided by a user. Communications circuitry 208 may be further configured to receive, over the communications network from QLP circuitry, a control signal configured to instruct the ATM to perform the function by crawling a tree-structured menu of the ATM. Communications circuitry 208 may be further configured to transmit, over the communications network to the ATM, the control signal. Apparatus 200 may further comprise processing circuitry 202 in communication with the communications circuitry 208. The processing circuitry 202 may be configured to transmit, to the communications circuitry 208 for transmission to the STT circuitry, the electronic information indicative of the command provided by the user. The processing circuitry 202 may be further configured to receive, from the communications circuitry 208 in response to the electronic information indicative of the command provided by the user, the control signal configured to instruct the ATM to perform the function by crawling the tree-structured menu of the ATM. The processing circuitry 202 may be further configured to transmit, to the communications circuitry 208 for transmission to the ATM, the control signal. In some embodiments, the processing circuitry 202 may be further configured to generate a response signal in response to the control signal and transmit the response signal to the communications circuitry 208. The communications circuitry 208 may be further configured to transmit, over the communications network TTS circuitry, a response signal generated in response to the control signal.

In some embodiments, apparatus 200 may be partially or wholly embodied as a chat bot or chat platform. For example, apparatus 200 may be a chat bot located at a bank. The chat bot may comprise STT circuitry 214 and NLP circuitry 212. A user may chat with the chat bot and state "I need some money." The STT circuitry 214 may translate this statement into text and transmit that text to the NLP circuitry 212, which may receive and translate that text into a query command signal. The apparatus 200 may determine that information required to crawl the tree-structured menu of the ATM, such as "checking" or "savings", is missing. The apparatus 200 may then generate a response signal, generate a vocal representation of that response signal (e.g., "Checking or Savings?"), and output that vocal representation of the response signal using input-output circuitry 206. In such embodiments, the apparatus 200 may attempt to build the transaction, and in turn the control signal, through the functionality of the chat bot.

Having described specific components of example devices involved in the present disclosure, example procedures for controlling a function of an ATM are described below in connection with FIGS. 3-6.

Example Operations for for Controlling a Function of an ATM

Figure 3:
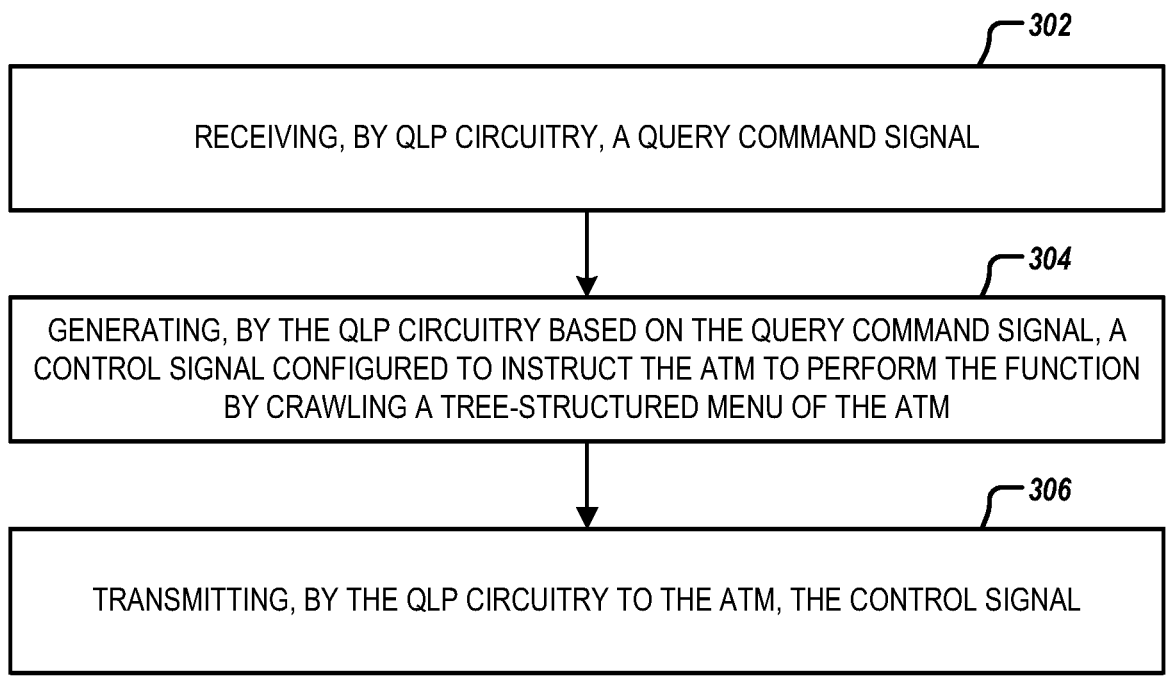
FIG. 3 illustrates an example flowchart for controlling a function of an ATM in accordance with some example embodiments described herein.

Turning to FIG. 3, an example flowchart 300 is illustrated that contains example operations for controlling a function of an ATM according to an example embodiment. The ATM may be any suitable ATM device, such as ATM device 110 described with reference to FIG. 1. The operations illustrated in FIG. 3 may, for example, be performed by one or more components described with reference to menu crawling system 102 shown in FIG. 1, apparatus 200 shown in FIG. 2, or both. In some embodiments, the various operations described in connection with FIG. 3 may be performed by the apparatus 200 by or through the use of one or more of processing circuitry 202, memory 204, input-output circuitry 206, communications circuitry 208, QLP circuitry 210, NLP circuitry 212, STT circuitry 214, TTS circuitry 216, any other suitable circuitry, and any combination thereof.

As shown by operation 302, the apparatus 200 includes means, such as QLP circuitry or the like, for receiving a query command signal. The QLP circuitry may be any suitable QLP circuitry described herein, such as QLP circuitry 210 described with reference to FIG. 2. In some embodiments, the apparatus 200 may include means, such as communications circuitry in communication with the QLP circuitry or the like, for receiving the query command signal. The communications circuitry may be any suitable communications circuitry described herein, such as communications circuitry 208 described with reference to FIG. 2. In some embodiments, the apparatus 200 may receive the query command signal from an ATM (e.g., ATM device 110) or a user device (e.g., user device 112), as described in more detail with reference to FIGS. 1 and 2. For example, the ATM or the user device may transmit the query command signal to the QLP circuitry of apparatus 200. In other embodiments, the apparatus 200 may receive the query command signal from NLP circuitry, as described in more detail with reference to FIG. 4. For example, the NLP circuitry may transmit the query command signal to the QLP circuitry of apparatus 200.

As shown by operation 304, the apparatus 200 further includes means, such as the QLP circuitry or the like, for generating a control signal based on the query command signal. The control signal may be configured to instruct the ATM to perform the function by crawling a tree-structured menu of the ATM. For example, the apparatus 200 may comprise QLP circuitry 210 for generating a control signal based on the query command signal. The control signal may be configured to instruct the ATM device 110 to perform the function (e.g., to withdraw currency from, or deposit currency to, the account associated with the user) by crawling a tree-structured menu of the ATM device 110. In another example, the memory 204 may store a map of the tree-structured menu of the ATM device 110. The QLP circuitry 210 may receive the query command signal and generate the control signal based on query command signal and the map of the tree-structured menu of the ATM device 110.

As shown by operation 306, the apparatus 200 further includes means, such as QLP circuitry or the like, for transmitting the control signal to the ATM. In some embodiments, the control signal may be transmitted directly to the ATM. In other embodiments, the QLP circuitry may transmit the control signal to a user device 112 or a peripheral device connected to the ATM and comprising an ATM device 110, which in turn relays the control signal to the ATM itself. In some embodiments, the apparatus 200 may include means, such as communications circuitry in communication with the QLP circuitry or the like, for transmitting the control signal. The communications circuitry may be any suitable communications circuitry described herein, such as communications circuitry 208 described with reference to FIG. 2.

In some embodiments, operations 302, 304, and 306 may not necessarily occur in the order depicted in FIG. 3, and in some cases one or more of the operations depicted in FIG. 3 may occur substantially simultaneously, or additional steps may be involved before, after, or between any of the operations shown in FIG. 3.

Figure 4:
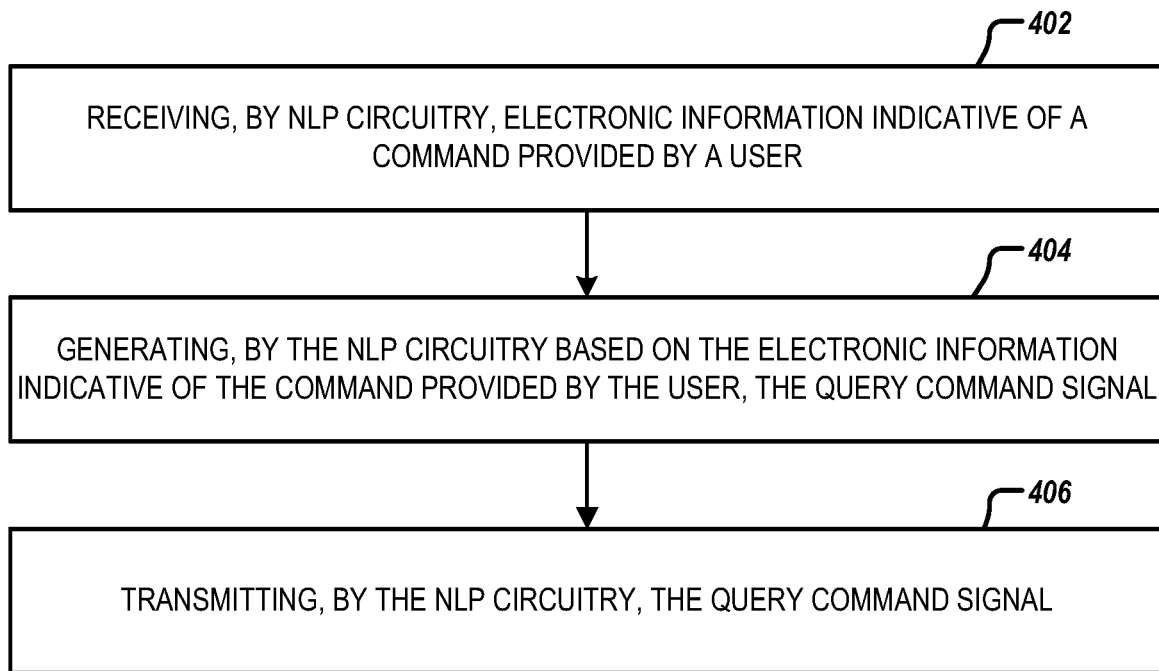
FIG. 4 illustrates an example flowchart for generating a query command signal in accordance with some example embodiments described herein.

Turning to FIG. 4, an example flowchart 400 is illustrated that contains example operations for generating a query command signal according to an example embodiment. The operations illustrated in FIG. 4 may, for example, be performed by one or more components described with reference to menu crawling system 102 shown in FIG. 1, or by an ATM device 110 or a user device 112 in communication with a menu crawling system 102. In any embodiments, the device performing these operations will comprise an apparatus 200, as shown in FIG. 2. In some embodiments, the various operations described in connection with FIG. 4 may be performed by the apparatus 200 by or through the use of one or more of processing circuitry 202, memory 204, input-output circuitry 206, communications circuitry 208, QLP circuitry 210, NLP circuitry 212, STT circuitry 214, TTS circuitry 216, any other suitable circuitry, and any combination thereof.

As shown by operation 402, the apparatus 200 includes means, such as NLP circuitry or the like, for receiving electronic information indicative of a command provided by a user. The NLP circuitry may be any suitable NLP circuitry described herein, such as NLP circuitry 212 described with reference to FIG. 2. In some embodiments, the apparatus 200 may include means, such as communications circuitry in communication with the NLP circuitry or the like, for receiving the electronic information indicative of the command provided by the user. The communications circuitry may be any suitable communications circuitry described herein, such as communications circuitry 208 described with reference to FIG. 2. In some embodiments, the electronic information indicative of the command provided by the user may comprise electronic information indicative of a textual representation of a voice command provided by a user. Optionally, the apparatus 200 may receive the electronic information indicative of the command provided by the user from STT circuitry, as described in more detail with reference to FIG. 5. For example, the STT circuitry may transmit the second electronic information indicative of the textual representation of the voice command provided by the user to the NLP circuitry, which may be a component of the same apparatus 200 that includes the STT circuitry, or which may be a component of a different apparatus in communication (either directly or indirectly via one or more communications networks 108) with the apparatus 200.

As shown by operation 404, the apparatus 200 further includes means, such as NLP circuitry or the like, for generating the query command signal based on the electronic information indicative of the command provided by the user. The NLP circuitry may be any suitable NLP circuitry described herein, such as NLP circuitry 212 described with reference to FIG. 2.

As shown by operation 406, the apparatus 200 further includes means, such as NLP circuitry or the like, for transmitting the query command signal. In embodiments where the apparatus 200 includes both the NLP circuitry and the QLP circuitry, the query command signal may be transmitted to the QLP circuitry, which then may perform the functions recited in connection with FIG. 3 above. In other embodiments, the apparatus 200 may include means, such as communications circuitry in communication with the NLP circuitry or the like, for transmitting the query command signal to another device that includes the QLP circuitry (such as a remote device). The communications circuitry may be any suitable communications circuitry described herein, such as communications circuitry 208 described with reference to FIG. 2.

In some embodiments, operations 402, 404, and 406 may not necessarily occur in the order depicted in FIG. 4, and in some cases one or more of the operations depicted in FIG. 4 may occur substantially simultaneously, or additional steps may be involved before, after, or between any of the operations shown in FIG. 4.

Figure 5:
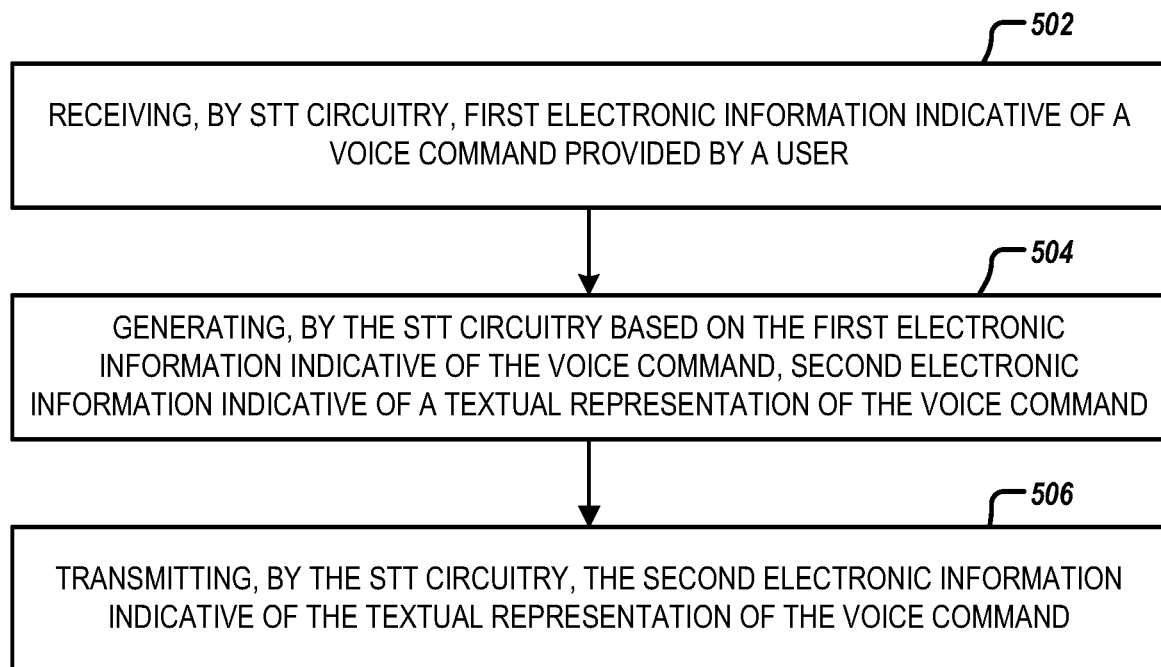
FIG. 5 illustrates an example flowchart for generating electronic information indicative of a textual representation of a voice command provided by a user in accordance with some example embodiments described herein.

Turning to FIG. 5 an example flowchart 500 is illustrated that contains example operations for generating electronic information indicative of a textual representation of a voice command provided by a user according to an example embodiment. The operations illustrated in FIG. 5 may, for example, be performed by one or more components described with reference to an ATM device 110, a user device 112, or menu crawling system 102, as shown in FIG. 1, as embodied by an apparatus 200, as shown in FIG. 2. In some embodiments, the various operations described in connection with FIG. 5 may thus be performed by the apparatus 200 by or through the use of one or more of processing circuitry 202, memory 204, input-output circuitry 206, communications circuitry 208, QLP circuitry 210, NLP circuitry 212, STT circuitry 214, TTS circuitry 216, any other suitable circuitry, and any combination thereof.

As shown by operation 502, the apparatus 200 includes means, such as STT circuitry or the like, for receiving first electronic information indicative of a voice command provided by a user. The STT circuitry may be any suitable STT circuitry described herein, such as STT circuitry 214 described with reference to FIG. 2. In some embodiments (such as where the STT circuitry is hosted remotely from a device with which a user directly interacts), the apparatus 200 may include means, such as communications circuitry in communication with the STT circuitry or the like, for receiving the first electronic information indicative of the voice command provided by the user (e.g., where the communications circuitry, in turn, receives the electronic information from a separate device that captures the voice input provided by a user, and that thereafter transmits the electronic information either directly to the communications circuitry or indirectly transmits the electronic information to the communications circuitry via one or more communications networks 108). The communications circuitry may be any suitable communications circuitry described herein, such as communications circuitry 208 described with reference to FIG. 2. Alternatively, this first electronic information may be received from a user via input-output circuitry 206 of the apparatus 200.

As shown by operation 504, the apparatus 200 further includes means, such as STT circuitry or the like, for generating, based on the first electronic information indicative of the voice command provided by the user, second electronic information indicative of a textual representation of the voice command provided by the user. The STT circuitry may be any suitable STT circuitry described herein, such as STT circuitry 214 described with reference to FIG. 2.

As shown by operation 506, the apparatus 200 further includes means, such as STT circuitry or the like, for transmitting second electronic information indicative of the textual representation of the voice command provided by the user. In some embodiments, the apparatus 200 may include means, such as communications circuitry in communication with the STT circuitry or the like, for transmitting the second electronic information indicative of a textual representation of the voice command provided by the user. The communications circuitry may be any suitable communications circuitry described herein, such as communications circuitry 208 described with reference to FIG. 2.

In some embodiments, operations 502, 504, and 506 may not necessarily occur in the order depicted in FIG. 5, and in some cases one or more of the operations depicted in FIG. 5 may occur substantially simultaneously, or additional steps may be involved before, after, or between any of the operations shown in FIG. 5. Moreover, in some embodiments, the operations depicted in FIG. 5 need not occur at all, such as when user input takes the form of text commands that need not be separately converted into a textual representation.

Figure 6:
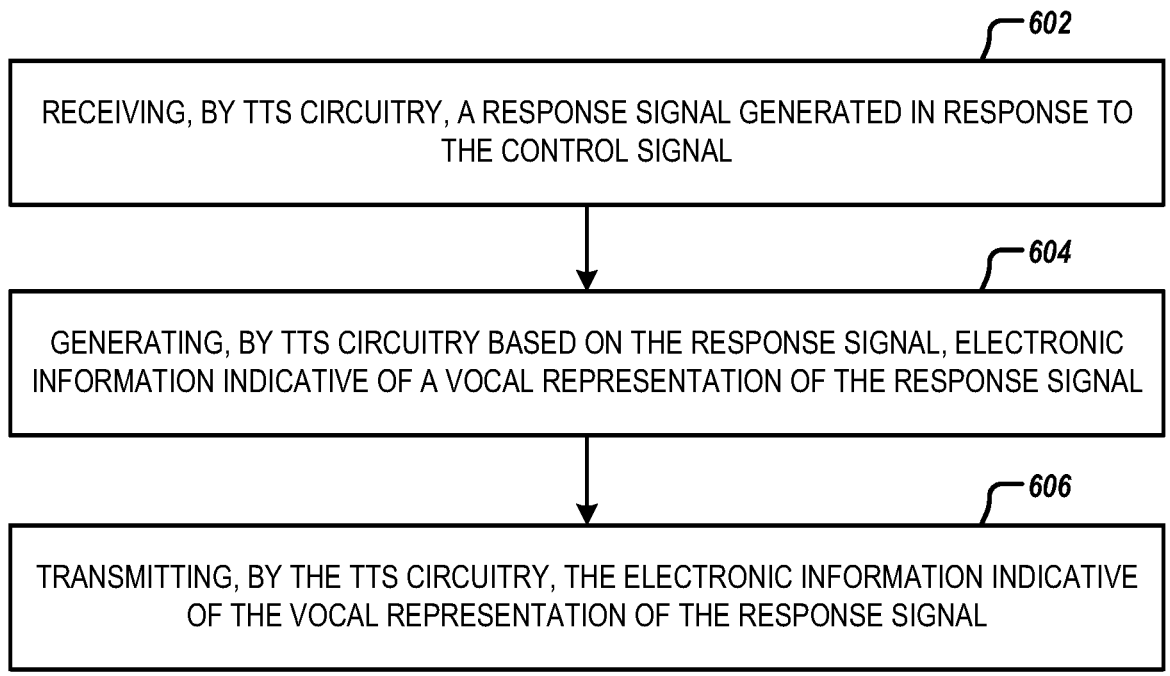
FIG. 6 illustrates an example flowchart for generating electronic information indicative of a vocal representation of a response signal in accordance with some example embodiments described herein.

Turning to FIG. 6 an example flowchart 600 is illustrated that contains example operations for generating electronic information indicative of a vocal representation of a response signal according to an example embodiment. The operations illustrated in FIG. 6 may, for example, be performed by one or more components described with reference to menu crawling system 102 shown in FIG. 1, apparatus 200 shown in FIG. 2, or both. In some embodiments, the various operations described in connection with FIG. 6 may be performed by the apparatus 200 by or through the use of one or more of processing circuitry 202, memory 204, input-output circuitry 206, communications circuitry 208, QLP circuitry 210, NLP circuitry 212, STT circuitry 214, TTS circuitry 216, any other suitable circuitry, and any combination thereof.

As shown by operation 602, the apparatus 200 includes means, such as TTS circuitry or the like, for receiving a response signal generated in response to the control signal. This response signal may be generated by an ATM itself in response to receipt of the control signal. In this regard, when the apparatus 200 is in direct communication with the ATM (e.g., where the apparatus comprises the ATM itself or an ATM device 110 or user device 112 in direct communication with an ATM), this response signal may be received from the ATM. However, when the apparatus 200 is only indirectly connected to the ATM, this response signal may be received via one or more intermediary apparatuses, such as an ATM device 110 or user device 112. The TTS circuitry may be any suitable TTS circuitry described herein, such as TTS circuitry 216 described with reference to FIG. 2. In some embodiments, the apparatus 200 may include means, such as communications circuitry in communication with the TTS circuitry or the like, for receiving the response signal by. The communications circuitry may be any suitable communications circuitry described herein, such as communications circuitry 208 described with reference to FIG. 2. Optionally, the apparatus 200 may receive the response signal in response to a transmission of the control signal by the QLP circuitry, as described in more detail with reference to FIG. 3.

As shown by operation 604, the apparatus 200 further includes means, such as TTS circuitry or the like, for generating, based on the response signal, electronic information indicative of a vocal representation of the response signal. This electronic information indicative of the vocal representation of the response signal may be generated using a map, database, or lookup table that receives the response signal and maps it to a corresponding set of electronic information indicative of the vocal representation of the received response signal. Alternatively, the electronic information indicative of the vocal representation may simply be an identifier uniquely identifying the vocal representation in a database.

As shown by operation 606, the apparatus 200 further includes means, such as TTS circuitry or the like, for transmitting the electronic information indicative of the vocal representation of the response signal. In embodiments in which the user directly interacts with the apparatus 200, the electronic information may be transmitted by outputting the electronic information by producing audio output of the vocal representation via input-output circuitry 206. In embodiments in which the user does not directly interact with the apparatus 200 (e.g., the apparatus 200 comprises a cloud server, but the user interacts with an ATM device 110 or a user device 112 that is in communication with the cloud server), the apparatus 200 may include means, such as communications circuitry in communication with the TTS circuitry or the like, for transmitting the electronic information indicative of the vocal representation of the response signal. The communications circuitry may be any suitable communications circuitry described herein, such as communications circuitry 208 described with reference to FIG. 2. For example, the TTS circuitry may transmit the electronic information indicative of the vocal representation of the response signal to the ATM device 110 or the user device 112 for audio output via input-output circuitry comprised by the ATM device 110 or the user device 112.

In some embodiments, operations 602, 604, and 606 may not necessarily occur in the order depicted in FIG. 6, and in some cases one or more of the operations depicted in FIG. 6 may occur substantially simultaneously, or additional steps may be involved before, after, or between any of the operations shown in FIG. 6.

FIGS. 3-6 thus illustrate flowcharts describing the operation of various systems (e.g., menu crawling system 102 described with reference to FIG. 1), apparatuses (e.g., apparatus 200 described with reference to FIG. 2), methods, and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations support combinations of means for performing the specified functions and combinations of operations for performing the specified functions. It will be understood that one or more operations of the flowcharts, and combinations of operations in the flowcharts, can be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for controlling a function of an automated transaction machine (ATM), the system comprising:
  a natural language processing (NLP) circuitry in communication with a query language processing (QLP) circuitry, wherein the NLP circuitry is configured to:
    receive, from a speech to text (STT) circuitry in communication with the NLP circuitry, electronic information indicative of a textual representation of a voice command provided by a user of the ATM;
    generate, based on the electronic information indicative of the voice command received from the STT circuitry, a query command signal;
  wherein the QLP circuitry is in communication with the ATM, and further wherein the QLP circuitry is configured to:
    receive, from the NLP circuitry in communication with the QLP circuitry, the query command signal;
    access, from a database, a map of a tree-structured menu of the ATM;
    generate, based on the query command signal and the tree-structured menu, a set of control signals configured to instruct the ATM to perform the function by crawling the tree-structured menu of the ATM, wherein the tree-structured menu of the ATM is a menu comprised of multiple screens in which advancement from a current screen to a next screen is made via a selection of a particular option presented on the current screen, wherein the set of control signals comprise a plurality of control signals each configured to provide the same signal as a signal provided had the user selected the particular option via an on-screen menu selection on the ATM, the set of control signals comprising the plurality of control signals used to execute the steps of the tree-structured menu associated in the order of the tree-structured menu; and
    transmit, to an ATM input signal processing interface of the ATM, the set of control signals, the set of control signals, when executed, causing display of the advancement of the tree-structured menu from a first screen to one or more subsequent screens in accordance with the completion of the function.

2. The system of claim 1, wherein the QLP circuitry is further configured to receive the query command signal from a thin-client application on a user device.

3. The system of claim 1, wherein the QLP circuitry is further configured to generate the set of control signals based on the map of the tree-structured menu of the ATM.

4. The system of claim 1, wherein the QLP circuitry is further configured to:
  generate electronic information indicative of a proximity of the ATM to a user device; and
  transmit, to the ATM, the set of control signals based on the electronic information indicative of the proximity of the ATM to the user device.

5. The system of claim 1, further comprising the NLP circuitry in communication with the QLP circuitry and the system further configured to:
  receive electronic information indicative of a command provided by a user;
  generate, based on the electronic information indicative of the command provided by the user, the query command signal; and
  transmit, to the QLP circuitry, the query command signal.

6. The system of claim 5, wherein the electronic information indicative of the command provided by the user comprises first electronic information indicative of a voice command provided by the user, wherein the system further comprises a speech-to-text (STT) circuitry in communication with the NLP circuitry and the system further configured to:
  receive the first electronic information indicative of the voice command;
  generate, based on the first electronic information indicative of the voice command, second electronic information indicative of a textual representation of the voice command; and
  transmit, to the NLP circuitry, the second electronic information indicative of the textual representation of the voice command,
  wherein the NLP circuitry is further configured to:
    receive, from the STT circuitry, the second electronic information indicative of the textual representation of the voice command; and
    generate the query command signal based on the second electronic information indicative of the textual representation of the voice command.

7. The system of claim 6, wherein one or more of the QLP circuitry, the NLP circuitry, and the STT circuitry is hosted remotely from the ATM.

8. The system of claim 6, further comprising a text-to-speech (TTS) circuitry in communication with an input-output circuitry, wherein the TTS circuitry is configured to:
- receive a response signal generated in response to the set of control signals;
- generate, based on the response signal, third electronic information indicative of a vocal representation of the response signal; and
- transmit, to the input-output circuitry, the third electronic information indicative of the vocal representation of the response signal.

9. The system of claim 8, wherein the STT circuitry comprises the TTS circuitry.

10. The system of claim 5, wherein the command provided by the user is indicative of a command to withdraw currency from an account, and wherein the set of control signals is configured to instruct the ATM to withdraw the currency from the account by crawling the tree-structured menu of the ATM.

11. The system of claim 5, wherein the command provided by the user is indicative of a command to deposit currency to an account, and wherein the set of control signals is configured to instruct the ATM to deposit the currency to the account by crawling the tree-structured menu of the ATM.

12. A method for controlling a function of an automated transaction machine (ATM), the method comprising:
- receiving, by a query language processing (QLP) circuitry, from a natural language processing (NLP) circuitry in communication with a speech to text (STT) circuitry, electronic information indicative of a textual representation of a voice command provided by a user of the ATM;
- generating, based on the electronic information indicative of the voice command received from the STT circuitry, a query command signal;
- receiving, by the QLP circuitry, from the NLP circuitry in communication with the QLP circuitry, the query command signal;
- accessing, from a database, a map of a tree-structured menu of the ATM;
  - generating, by the QLP circuitry based on the query command signal and the tree-structured menu, a set of control signals configured to instruct the ATM to perform the function by crawling the tree-structured menu of the ATM, wherein the tree-structured menu of the ATM is a menu comprised of multiple screens in which advancement from a current screen to a next screen is made via a selection of a particular option presented on the current screen, wherein the set of control signals comprise a plurality of control signals each configured to provide the same signal as a signal provided had the user selected the particular option via an on-screen menu selection on the ATM, the set of control signals comprising the plurality of control signals used to execute the steps of the tree-structured menu associated in the order of the tree-structured menu; and
  - transmitting, by the QLP circuitry to an ATM input signal processing interface of the ATM, the set of control signals, the set of control signals, when executed, causing display of the advancement of the tree-structured menu from a first screen to one or more subsequent screens in accordance with the completion of the function.

13. The method of claim 12, further comprising:
- receiving, by the NLP circuitry, electronic information indicative of a command provided by the user;
- generating, by the NLP circuitry based on the electronic information indicative of the command provided by the user, the query command signal; and
- transmitting, by the NLP circuitry, the query command signal.

14. The method of claim 13, wherein the electronic information indicative of the command provided by the user comprises first electronic information indicative of a voice command provided by the user, the method further comprising:
- receiving, by a speech-to-text (STT) circuitry, the first electronic information indicative of the voice command;
- generating, by the STT circuitry based on the first electronic information indicative of the voice command, second electronic information indicative of a textual representation of the voice command;
- transmitting, by the STT circuitry, the second electronic information indicative of the textual representation of the voice command;
- receiving, by the NLP circuitry, the second electronic information indicative of the textual representation of the voice command; and
- generating, by the NLP circuitry based on the second electronic information indicative of the textual representation of the voice command, the query command signal.

15. The method of claim 14, wherein one or more of the QLP circuitry, the NLP circuitry, and the STT circuitry is hosted remotely from the ATM.

16. The method of claim 14, further comprising:
- receiving, by a text-to-speech (TTS) circuitry, a response signal generated in response to the control signal;
- generating, by the TTS circuitry based on the response signal, third electronic information indicative of a vocal representation of the response signal; and
- transmitting, by the TTS circuitry, the third electronic information indicative of the vocal representation of the response signal.

17. An apparatus for controlling a function of an automated transaction machine (ATM), the apparatus comprising:
- a communications circuitry configured to:
  - transmit, over a communications network to a speech-to-text (STT) circuitry, electronic information indicative of a textual representation of a voice command provided by a user of the ATM;
  - generate, over the communications network from a natural language processing (NLP) circuitry, based on the electronic information indicative of the voice command received from the STT circuitry, a query command signal;
  - access, from a database, and transmit a map of a tree-structured menu of the ATM;
  - receive, from the NLP circuitry in communication with a query language processing (QLP) circuitry, the query command signal;
  - generate, by the QLP circuitry, a set of control signals configured to instruct the ATM to perform the function by crawling the tree-structured menu of the ATM, wherein the tree-structured menu of the ATM is a menu comprised of multiple screens in which advancement from a current screen to a next screen or previous screen is made via a selection of a particular option presented on the current screen, and wherein the set of control signals comprise a plurality of control signals each configured to provide the same signal as a signal provided had the user selected the particular option via an on-screen menu selection on the ATM, the set of control signals comprising the plurality of control signals used to execute the steps of the tree-structured menu associated in the order of the tree-structured menu; and transmit, over the communications network to an ATM input signal processing interface of the ATM, the set of control signals, the set of control signals, when executed, causing display of the advancement of the tree-structured menu from a first screen to one or more subsequent screens in accordance with the completion of the function; and a processing circuitry in communication with the communications circuitry and configured to transmit, to the communications circuitry, the electronic information indicative of the command provided by the user;

receive, from the communications circuitry in response to the electronic information indicative of the command provided by the user, the set of control signals configured to instruct the ATM to perform the function by crawling the tree-structured menu of the ATM; and transmit, to the communications circuitry, the set of control signals.

18. The apparatus of claim 17, wherein the communications circuitry is further configured to transmit, over the communications network to a text-to-speech (TTS) circuitry, a response signal generated in response to receiving the set of control signals, and wherein the processing circuitry is further configured to:

generate, in response to receiving the set of control signals, the response signal; and transmit, to the communications circuitry, the response signal.

19. The apparatus of claim 17, wherein the electronic information indicative of the command provided by the user comprises electronic information indicative of a command to withdraw currency from an account, and wherein the set of control signals is configured to instruct the ATM to withdraw the currency from the account by crawling the tree-structured menu of the ATM.

20. The apparatus of claim 17, wherein the electronic information indicative of the command provided by the user comprises electronic information indicative of a command to deposit currency to an account, and wherein the set of control signals is configured to instruct the ATM to deposit the currency to the account by crawling the tree-structured menu of the ATM.

* * * * *